United States Patent [19]
Asder

[11] 3,735,514
[45] May 29, 1973

[54] BIRD FRIGHTENING DEVICE

[76] Inventor: John K. Asder, 310 W. Foothill Boulevard, Arcadia, Calif. 91006

[22] Filed: Apr. 21, 1971

[21] Appl. No.: 135,961

[52] U.S. Cl. ..................40/39, 40/106.3, 40/138
[51] Int. Cl. ..............................................G09f 11/02
[58] Field of Search................40/39, 37, 40, 138, 40/106.3

[56] References Cited

UNITED STATES PATENTS

| 1,167,502 | 1/1916 | Huffman et al. | 40/39 X |
| 1,670,630 | 5/1928 | McLaughlin | 40/138 |
| 954,288 | 4/1910 | Holloway | 40/138 X |
| 1,666,806 | 4/1928 | Wright | 40/39 X |

FOREIGN PATENTS OR APPLICATIONS

| 378,459 | 8/1907 | France | 40/39 |

Primary Examiner—Robert W. Michell
Assistant Examiner—L. R. Oremland
Attorney—Jessup & Beecher

[57] ABSTRACT

A bird frightening device including a likeness of a cat connected to a platform, the platform being horizontally balanced upon a stanchion, the platform being pivotable in a horizontal plane with respect to the stanchion, the cat likeness being connected to the platform by a pin and loop arrangement to permit low frictional three dimensional movement of the likeness with respect to the platform, the movement of both the likeness and the platform being effected by wind currents contacting a vane, the vane being connected to both the likeness and the platform.

7 Claims, 4 Drawing Figures

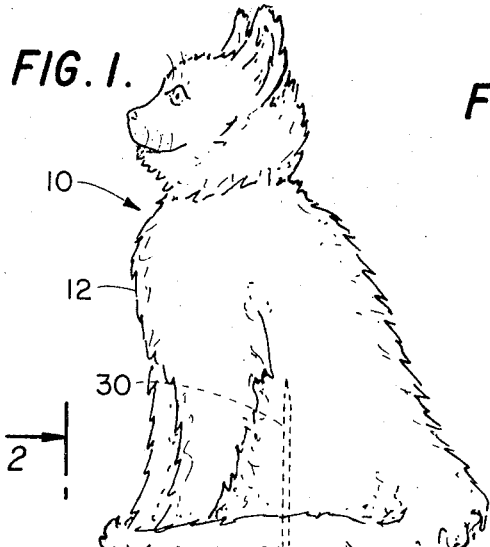
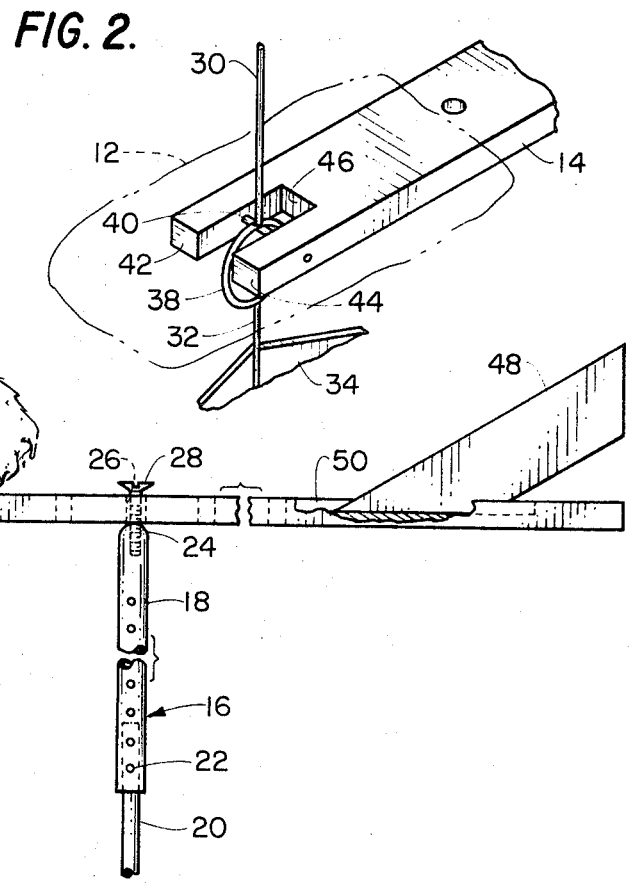
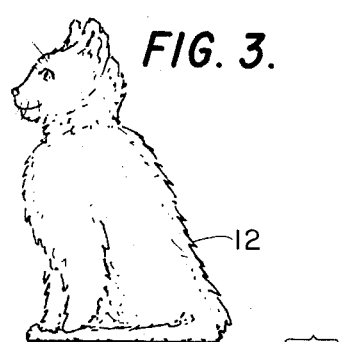
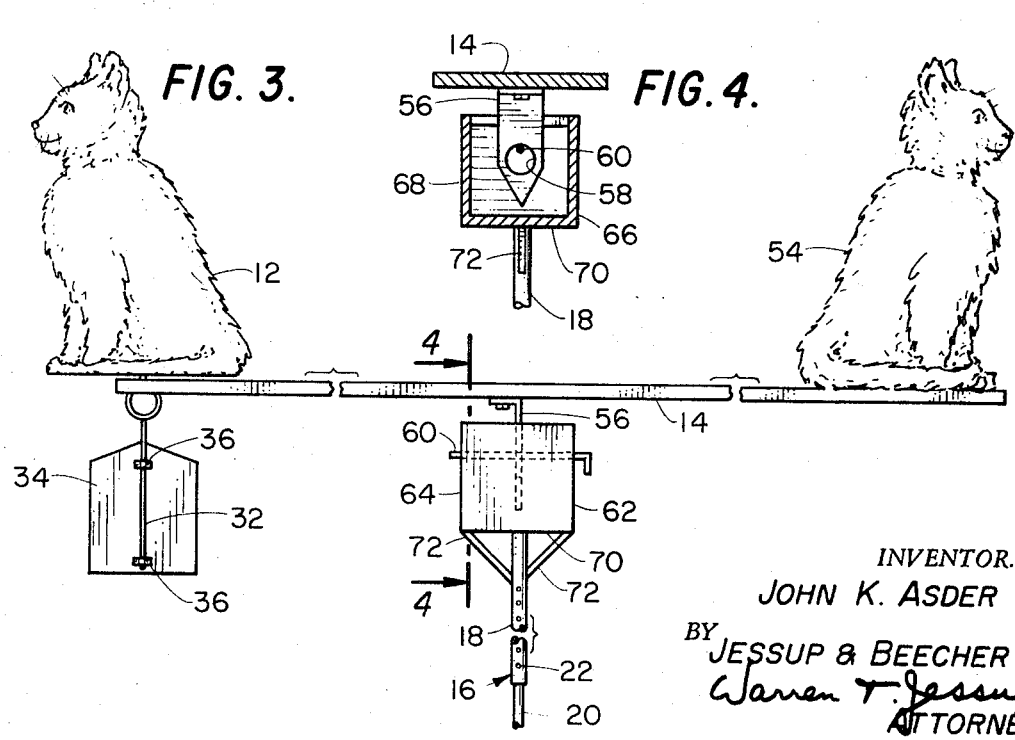
INVENTOR.
JOHN K. ASDER
BY JESSUP & BEECHER
Warren T. Jessup
ATTORNEYS 3,735,514

BIRD FRIGHTENING DEVICE

BACKGROUND OF THE INVENTION

The field of this invention relates to devices for the protection of crops from destruction or damage by animals, and more specifically to a device which tends to prevent birds from eating fruit which commonly grows on trees and bushes.

A business of substantial magnitude is the agricultural business of growing fruit. Tree growing fruits such as peaches, pears, cherries and the like are grown in both large and small orchards. It is also not uncommon for small fruits such as raspberries, blueberries, boysenberries and the like to be grown in vast areas. Additionally, both tree growing fruits and bush growing fruits are frequently grown adjacent single family residences in either small orchards or in a single tree or bush.

One of the favorite foods of birds is fruit. There is no known fruit that is safe for human consumption that is not subject to being devoured by birds. To keep birds from attacking crops is most difficult since birds are not subject to normal physical barriers (such as fences). Therefore, some other means must be employed which tends to keep birds away from crops.

In the past, with some success, a scarecrow has been employed. Basically, the scarecrow has the general resemblence of a human being and is located within the area of the crop. Normally, birds are frightened by human beings. However, a scarecrow makes no movement but remains as a stationary figure. It does not take very long for the birds to determine that the scarecrow is harmless.

SUMMARY OF THE INVENTION

The bird frightening device of this invention employs the use of an animal likeness, that of a cat, which birds of all species fear. The cat likeness is connected to one end of a rod with the other end of the rod being secured to a vane. Intermediate the vane and the likeness the rod is formed into the shape of a circular loop. The likeness is to be supported, upon a platform by means of a pin substantially horizontally connected to the platform and passing through the loop. This causes the likeness to be low frictionally supported with respect to the platform and readily capable of pivotable movement in the fore and aft directions as well as in the lateral directions. The vane is to be quite sensitive to air currents so that with only a slight air current, fore and aft movement as well as lateral movement of the likeness will occur. The likeness is supported at one end of the platform with the platform being supported in a balanced relationship with respect to the stanchion. The connection with the stanchion is such so as to permit the platform to rotate substantially in a horizontal plane with respect to the stanchion, as well as oscillate vertically. The stanchion may be adjustable so as to locate the likeness at a predetermined height above the ground so as to make the device of this invention usable for tree crops as well as bush crops.

BRIEF DESCRIPTION OF THE DRAWING

FIG. 1 is an overall side view of a first embodiment of the device of this invention;

FIG. 2 is a fragmentary front view of the first embodiment of this invention taken along line 2—2 of FIG. 1;

FIG. 3 is a view similar to FIG. 1 but of a second embodiment of the device of this invention; and FIG. 4 is a fragmentary cross sectional view of the second embodiment device of this invention taken along line 4-4 of FIG. 3.

DETAILED DESCRIPTION OF THE SHOWN EMBODIMENT

Referring particularly to the drawing, there is shown in FIG. 1 a first embodiment 10 of this invention basically comprising a cat likeness 12, a platform 14, and a stanchion 16. The likeness 12 is to be preferably formed as a solid mass from a plastic or metallic material. However, the likeness 12 may be composed from sheet material if desired.

The stanchion 16 is to be composed of an upper element 18 and a lower element 20. The lower element 20 is adapted to telescopingly cooperate within the upper element 18. A plurality of apertures 22 are located longitudinally spaced apart within the upper element 18. A pin (not shown) is adapted to cooperate with a single one of the apertures 22 and the lower element 20 is to be movable within the upper element 18 until such contacts the pin. By relocation of the pin within another one of the apertures 22, elongation or shortening of the overall stanchion 16 will occur. This adjustment is desired so as to locate the likeness 12 at different spacing levels above the ground. In other words, if the device of this invention is employed to protect the small crops such as grapes, the likeness 12 will only need to be 3, 4, or 5 feet above the ground. If it is desired that the likeness 10 be employed to protect peaches, the likeness 12 should be spaced ten to fifteen feet above the ground.

The upper end of the upper element 18 is formed into a contour 24 which basically comprises a rounded configuration. Formed within the platform 14 is an opening 26. Opening 26 may be located at any desired longitudinal position within the platform 14, however, the location of the opening 26 should be such so that the platform 14 will tend to balance upon the stanchion 16. A fastener 28 such as a conventional wood screw is adapted to pass through the opening 26 and be fixedly retained within the upper element 18 and the stanchion 16. The lower surface of the platform 14 is to come into contact with the contour 24. The fastener 28 is not tightened so that movement is permitted of the platform 14 with respect to the stanchion 16. Actually, it is desired that 300 and 60° pivotal movement in a horizontal plane is to occur between the platform 14 and the stanchion 16. Additionally, because of the small surface area of the stanchion 16 in contact with the platform 14 (due to the contour 24), the platform 14 is capable of incurring pivotal movement in a vertical direction which may be termed generally as oscillating.

The likeness 12 is shown impaled by the first end 30 of a rod. The opposite or second end 32 of the rod is connected to a vane 34. The second end 32 of the rod is secured by brackets 36 to the vane 34. Intermediate the first end 30 and the second end 32 is a circular shaped loop 38. The loop 38 is adapted to cooperate with a pin 40. The pin 40 is to be located between the legs 42 and 44 of the bifurcated end 46 of the platform 14. The location of the pin 40 is such as to be directly adjacent the end of the platform 14. The reason for this is to locate the likeness 12 the greatest distance from the stanchion 16.

Connected to the opposite end of the platform 14 is a balancing fin 48. The balancing fin 48 is composed of a length of sheet material and is connected to the platform 14 by means of a longitudinal slot 50. The fin 48 is retained within the slot 50 by means of a frictional fit. The fin 48 is adapted to be sensitive to wind currents for reasons which will be explained further on in the specification. The fin 48 is also to be adjustable longitudinally within the slot 50. This adjustment is such so that the weight distribution upon the platform 14 on each side of the stanchion 16 is to be so that the platform 14 assumes a substantially horizontal position.

Referring particularly to FIGS. 3 and 4 of the drawing, there is shown a second embodiment 52 of the device of this invention. Within the second embodiment 52, like numerals of the first embodiment 10 have been employed to refer to similar parts in the second embodiment 52. It is to be noted within the second embodiment 52, the balancing fin 48 has been omitted and a second likeness 54 has been mounted on the opposite end of the platform 14. This is considered to be an option on the part of the operator as he may either employ two likenesses, or may employ the single likeness as shown in the first embodiment 10.

The primary distinction of the second embodiment 52 relates to the mounting of the platform 14 upon the stanchion 16. Secured to the lower surface of the platform 14 is a connecting bracket 56. The main portion of the connecting bracket 56 depends at a right angle with respect to the platform 14. Within the connecting bracket 14 is an opening 58. The opening 58 is adapted to receive a pin 60. It is to be noted that the opening 58 is substantially enlarged so as to give a loose sloppy fit with respect to the pin 60.

The pin 60 is fixedly located between spaced apart side elements 62 and 64. Side elements 66 and 68 are also employed to connect together the side elements 62 and 64 forming substantially a square box arrangement. A bottom 70 connects together each of the side elements with the bottom 70 being fixedly secured to the upper element 18 of the stanchion 16. Braces 72 are also employed to give additional support between the upper element 18 and the bottom 70. It is to be noted that the top of the resultant box (formed by the side elements 62 and 68 and the bottom 70) is open with the connecting bracket 56 extending therethrough.

The operation of the first embodiment 10 of this invention is as follows: It will be assumed that the device 10 of this invention is installed in an outdoors environment adjacent fruit growing trees or bushes. Upon the wind coming into contact with the vane 34, the likeness 12 is caused to oscillate laterally as well as to oscillate fore and aft. The connection of the loop 38 with the pin 40 creates an extremely low frictional connection. As a result, a small wind current contacting the vane 34 causes the likeness 12 to move back and forth and side to side. This movement of the likeness 12 is to give the appearance to birds that the likeness 12 is alive. Since a cat is a natural enemy to birds, the birds tend to stay away from the fruit growing area in which the likeness 12 is located.

Additionally, platform 14 is horizontally balanced by means of the balancing fin 48 upon the stanchion 16. The platform 14 is capable of rotational movement about the stanchion 16 in a horizontal plane. The connection of the platform 14 to the stanchion 16 is a low frictional connection facilitating the rotational movement of the platform 14. The source of power to effect the rotational movement of platform 14 is the wind currents which come into contact with the vane 34 and also the wind currents which come into contact with the fin 48. This additional movement of the likeness 12 adds to its appearance of being alive. Further, the platform 14 is permitted to oscillate vertically a certain amount relative to the contour 34. This vertical movement is pivoted by the sides of the opening 26 and the fastener 28. In other words, the looser the fit established between the fastener 28 and the opening 26, the greater the vertical oscillation of the platform 14.

The operation of the second embodiment 52 is basically the same as that of the first embodiment 10. The only distinction is in the connection of the platform 14 to the stanchion 16. The connection is such that an extremely low frictional connection is established therebetween, so as to facilitate the horizontal rotational movement of the platform 14 as well as the vertical oscillating movement. This is caused by the enlarged opening 58 cooperating about small diameter pin 60. Movement of the platform 14 with respect to the stanchion 16 is readily facilitated. As a result, the likeness 12 as well as the likeness 54 is constantly in movement.

What is claimed is:

1. A bird frightening device to decrease the amount of bird damage to crops comprising:
   a platform;
   a mounting means;
   a likeness of a cat connected by said mounting means to said platform, said mounting means permitting three dimensional low frictional movement of said likeness with respect to said platform, said mounting means includes a loop and a pin, said pin being secured to said platform and disposed substantially horizontal, said pin passing through said loop, a rod, said loop being secured to said rod intermediate the first end and the second end of said rod, said first end of said rod being secured to said likeness; and
   a stanchion connected to said platform, said stanchion supports said platform substantially in a horizontal plane spaced above the ground, said platform capable of pivotal movement in a horizontal plane relative to said stanchion.

2. A device as defined in claim 1 wherein:
   said second end of said rod being connected to a vane, said vane being movable by the wind.

3. A device as defined in claim 2 wherein:
   said platform being connected to said stanchion adjacent its midpoint, said likeness connected to said platform adjacent one end thereof.

4. A device as defined in claim 3 including:
   a balancing means connected to said platform adjacent the opposite end of said platform, said balancing means to counterbalance the weight of said likeness to thereby maintain said platform substantially horizontal.

5. A device as defined in claim 4 wherein:
   said balancing means being adjustable longitudinally with respect to said platform.

6. A device as defined in claim 5 wherein:
   said stanchion being adjustable so as to locate said platform a desired height above the ground.

7. A bird frightening device to decrease the amount of bird damage to crops:
   a platform;
   a mounting means;

a likeness of a cat connected by said mounting means to said platform, said mounting means permitting three dimensional low frictional movement of said likeness with respect to said platform;

a stanchion connected to said platform, said stanchion supports said platform substantially in a horizontal plane spaced above the ground, said platform capable of pivotal movement in both a horizontal plane and in a vertical plane relative to said stanchion; and a connecting bracket secured to said platform, said connecting bracket being located substantially vertical and having an opening formed therein, a pin attached to said stanchion and located substantially horizontal, said pin passing through said opening.

* * * * *